United States Patent
Lin et al.

(10) Patent No.: US 8,926,475 B2
(45) Date of Patent: Jan. 6, 2015

(54) DEVICE CAPABLE OF ADJUSTING IMAGES ACCORDING TO BODY MOTION OF USER AND PERFORMING METHOD THEREOF

(75) Inventors: Chyi-yeu Lin, Taipei (TW); Hashimoto Koichi, Sendai (JP)

(73) Assignee: National Taiwan University of Science and Technology, Taipei (TW)

(*) Notice: Subject to any disclaimer, the term of this patent is extended or adjusted under 35 U.S.C. 154(b) by 1006 days.

(21) Appl. No.: 12/986,219

(22) Filed: Jan. 7, 2011

(65) Prior Publication Data

US 2012/0046144 A1  Feb. 23, 2012

(30) Foreign Application Priority Data

Aug. 19, 2010 (TW) .................................. 99127761 A

(51) Int. Cl.
*A63B 24/00* (2006.01)
(52) U.S. Cl.
USPC ........................................ 482/8; 482/1; 482/9
(58) Field of Classification Search
CPC ...................................................... A63B 24/00
USPC .......................... 482/1–9, 900–902; 434/247
See application file for complete search history.

(56) References Cited

U.S. PATENT DOCUMENTS

| | | | |
|---|---|---|---|
| 5,527,239 A * | 6/1996 | Abbondanza | 482/8 |
| 5,577,981 A | 11/1996 | Jarvik | |
| 7,713,172 B2 * | 5/2010 | Watterson et al. | 482/4 |
| 2004/0208394 A1 | 10/2004 | Kurata | |
| 2008/0022348 A1 * | 1/2008 | Shen | 725/135 |
| 2008/0125289 A1 * | 5/2008 | Pryor et al. | 482/8 |
| 2009/0156363 A1 | 6/2009 | Guidi et al. | |
| 2012/0295764 A1 * | 11/2012 | Brammer | 482/9 |

FOREIGN PATENT DOCUMENTS

| | | |
|---|---|---|
| CN | 2734270 Y | 10/2005 |
| CN | 2796757 Y | 7/2006 |
| CN | 2907771 Y | 6/2007 |
| CN | 201085891 Y | 7/2008 |
| CN | 201308742 Y | 9/2009 |
| EP | 2070566 | 6/2009 |
| GB | 2431595 A | 5/2007 |
| JP | 2004317813 A | 11/2004 |
| JP | 3139781 U | 2/2008 |
| JP | 2009224841 A | 10/2009 |
| TW | 201019997 A | 6/2010 |

* cited by examiner

*Primary Examiner* — Glenn Richman

(57) ABSTRACT

A device capable of adjusting images according to a body motion of a user and a performing method thereof are disclosed. The device includes a display unit, at least one camera unit, and a control unit. The display unit functions for displaying images. The camera unit captures at least one motion image of the user. The control unit is electrically coupled to the display unit and the camera unit. The control unit receives the motion image of the user and adjusts the display unit according to the motion image of the user, whereby the images displayed by or on the display unit move as does the user.

6 Claims, 6 Drawing Sheets

DEVICE CAPABLE OF ADJUSTING IMAGES ACCORDING TO BODY MOTION OF USER AND PERFORMING METHOD THEREOF

BACKGROUND OF THE INVENTION

1. Claim of Priority

This application claims priority to Taiwanese Patent Application No. 099127761 filed Aug. 19, 2010.

2. Field of the Invention

The present invention generally relates to a control device, and more particularly to a device capable of adjusting images according to a body motion of a user and a performing method thereof.

3. Description of Prior Art

People living in modern time have a busy lifestyle, so they have no time to go exercise outdoors. Moreover, even If people have time to go exercise outdoors, it is not suitable or advisable to go exercise outdoors when there is rainy weather or cold weather. Further, one might worry to be overly exposed to the sun when the weather is sunny.

Therefore, based on various reasons, many people like to exercise indoors by using exercising devices to be in good health and keep fit. One most commonly exercising device that can be used to exercise in a back and forth manner is a treadmill. FIG. 1 illustrates a user 70 jogging on a treadmill 100. The user 70 might get bored if he or she only exercises on the treadmill 100. A liquid crystal display device 110 can be disposed in front of the user 70 on the treadmill 100 for providing multimedia images for the user 70 to view while the user 70 is exercising on the treadmill 100.

However, when the user 70 is exercising on the treadmill 100, the head portion of the user 70 is moving as well. Since the liquid crystal display device 110 is in a non-moving state, the user 70 views images that move up, down, left, and right. The user 70 perceives poor and inadequate visual sensing; therefore, the eyes of the user 70 are uncomfortable. In addition, other exercising devices that can be used to exercise in a back and forth manner include an incline trainer 120 as shown in FIG. 2, and an elliptical trainer 130 as shown in FIG. 3. Similarly, the same problem of poor and inadequate visual sensing that the user 70 perceives when viewing the liquid crystal display device 110 on the incline trainer 120 or the elliptical trainer 130 exists.

Therefore, there is a need to solve the above-mentioned problem occurring when a multimedia device (such as the liquid crystal display device 110) is disposed in a fixed and non-movable manner on or in front of an exercising device that can be used to exercise in a back and forth manner.

SUMMARY OF THE INVENTION

An objective of the present invention is to provide a device capable of adjusting images according to a body motion of a user and a performing method thereof, which are capable of providing relatively non-moving images with respect to the user.

According to an aspect of the present invention, a device capable of adjusting images according to body motion of a user is provided, comprising a display unit, at least one camera unit, and a control unit. The display unit functions to display images. The camera unit captures at least one motion image of the user. The control unit is electrically coupled to the display unit and the camera unit. The control unit receives the motion image of the user and adjusts the display unit according to the motion image of the user, whereby the images displayed on the display unit move as does the user.

According to another aspect of the present invention, a method to be performed in a device capable of adjusting images according to body motion of a user is provided, wherein the device capable of adjusting images according to the body motion of user comprises a display unit, at least one camera unit, and a control unit electrically coupled to the display unit and the camera unit. The method comprises steps of: capturing at least one motion image of the user by the camera; receiving the motion image of the user by the control unit; and adjusting the display unit according to the motion image of the user by the control unit, whereby the images displayed on the display unit move as does the user.

The device capable of adjusting images according to body motion of user and the performing method thereof can provide relatively non-moving images with respect to the user, and therefore the user can have better visual sensing.

The prevent invention mainly uses a visual servoing technique or so-called Vision-Based Robot Control technique. The visual servoing technique or so-called Vision-Based Robot Control technique utilizes a feedback visual signal as an input signal in a move control system. The visual servoing technique has been successfully applied to intelligent robotics and other fields. The following papers are references of the visual servoing technique: [1] S. A. Hutchinson, G. D. Hager, and P. I. Corke, A tutorial on visual servo control, IEEE Transactions on Robotics and Automation, 12(5):651-670, October 1996; [2] F. Chaumette and S. Hutchinson, Visual Servo Control, Part I: Basic Approaches, IEEE Robotics and Automation Magazine, 13(4):82-90, December 2006; [3] F. Chaumette and S. Hutchinson, Visual Servo Control, Part II: Advanced Approaches, IEEE Robotics and Automation Magazine, 14(1):109-118, March 2007.

DETAILED DESCRIPTION OF THE INVENTION

Figure 1:
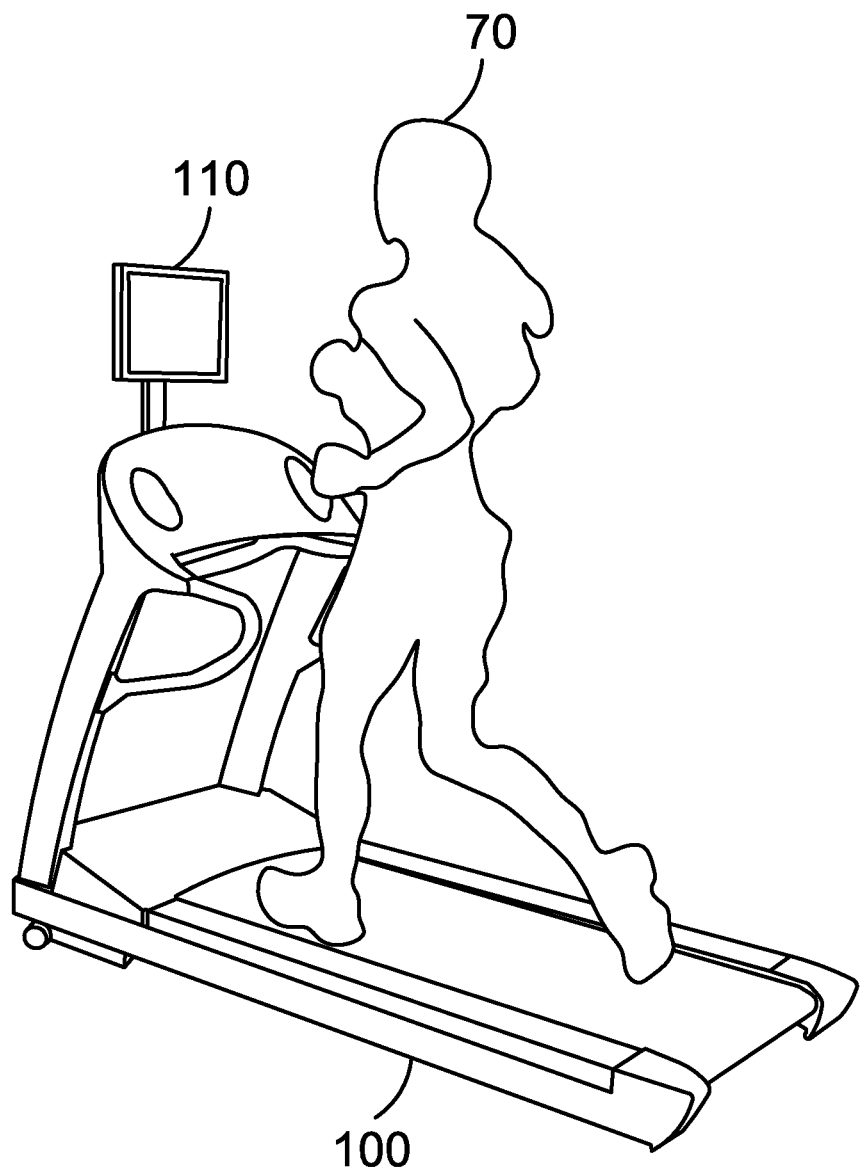
FIG. 1 illustrates a user jogging on a treadmill.
Figure 3:
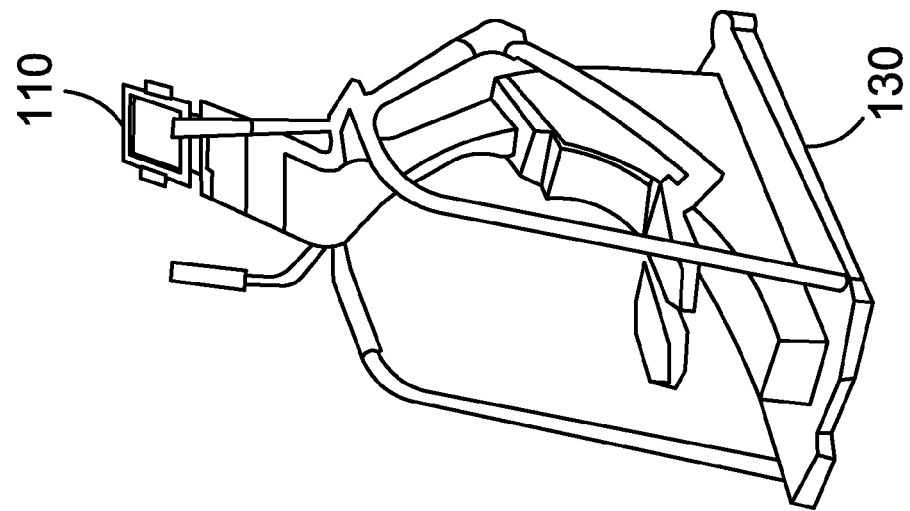
FIG. 3 illustrates an elliptical trainer.
Figure 2:
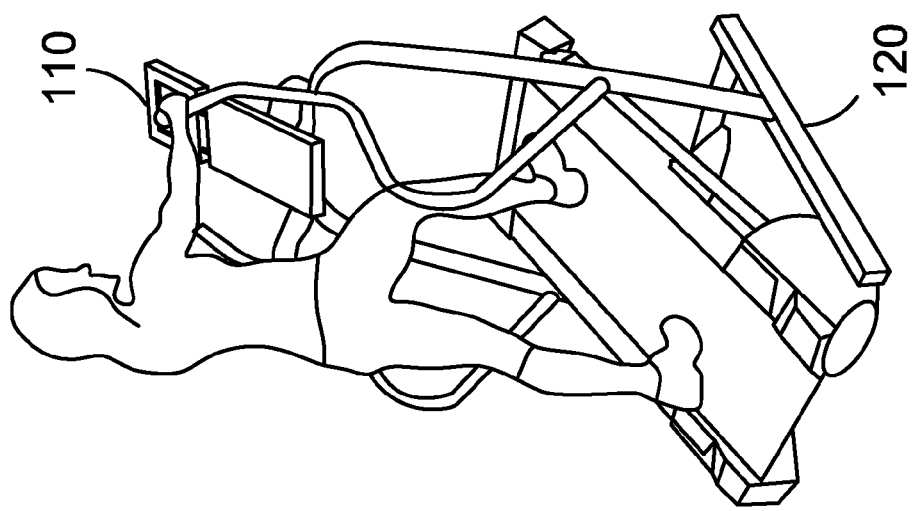
FIG. 2 illustrates an incline trainer.
Figure 4:
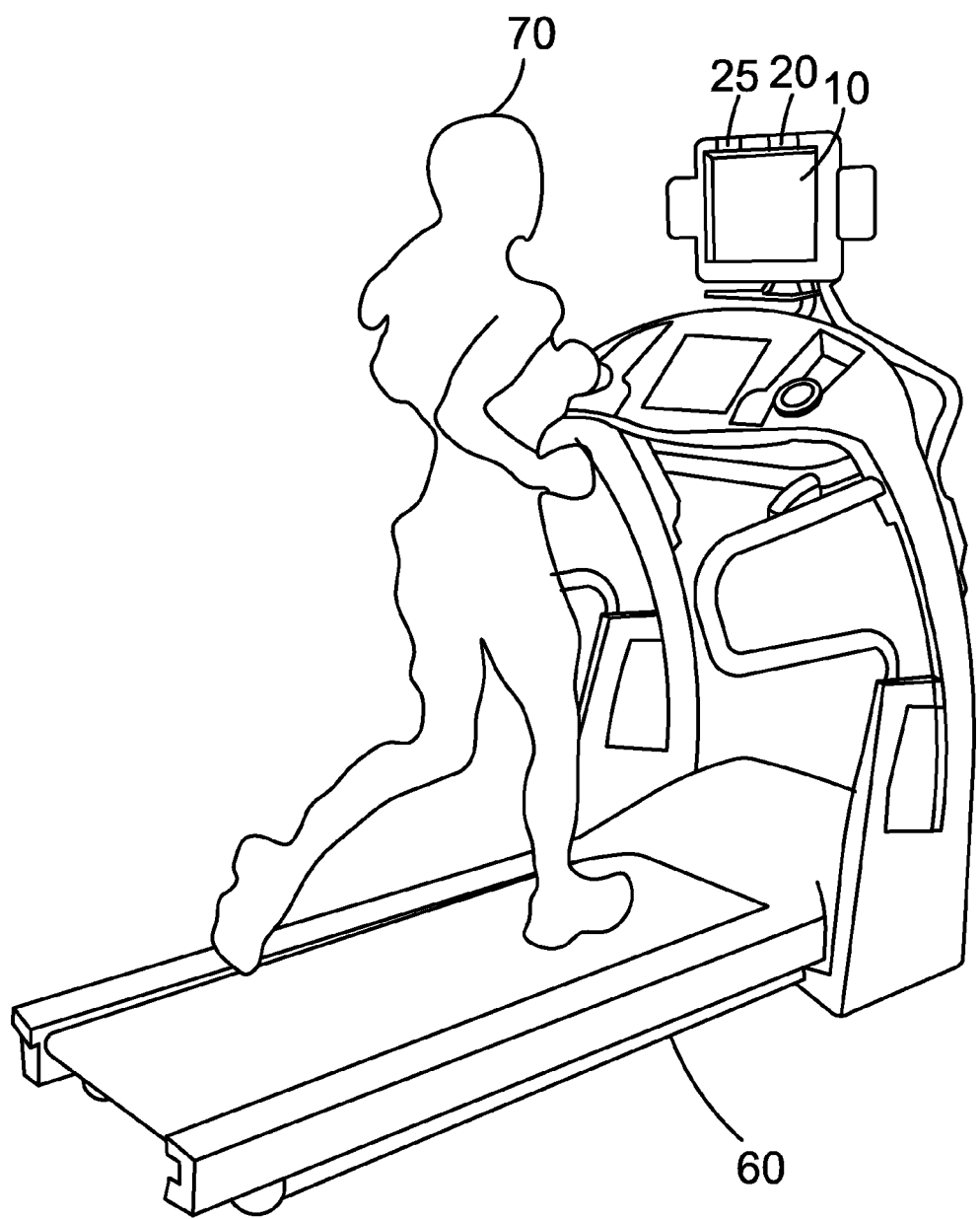
FIGS. 4 and 5 illustrate a device that is capable of adjusting images according to body motion of user according to a first embodiment of the present invention.
Figure 5:
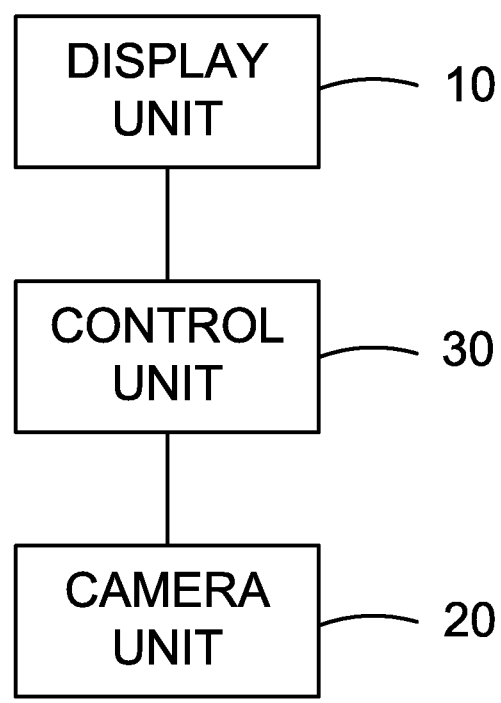

With reference to the drawings and in particular to FIGS. 4 and 5, a device 1 that is capable of adjusting images according to a body motion of a user 70 according to a first embodiment of the present invention is illustrated. As an example for description, the device 1 is applied to an exercising device which is provided for the user 70 to exercise in a back and forth manner. In the present embodiment, a treadmill 60 is taken as an example for the exercising device. The device 1 of the present invention comprises a display unit 10, a camera unit 20, and a control unit 30.

The display unit 10 functions to display images for the user 70 to view. The images can be from a TV program or a video compact disc (VCD). In the present embodiment, the display unit 10 is disposed on the treadmill 60 and in front of the user 70.

The camera unit 20 can be, for example, a charge coupled device (CCD) or a complementary metal oxide semiconductor (CMOS) sensor. The camera unit 20 functions to capture at least one motion image of the user 70. Accordingly, the camera unit 20 has to be disposed at a position to be able to capture an image of the user 70. In a preferred embodiment, the camera unit 20 is disposed at a position to capture an image of the head portion of the user 70. In the present embodiment, the camera unit 20 is integrated with the display unit 10 and disposed above the display unit 10. In another embodiment, the camera unit 20 can be disposed at other positions and separate from the display unit 10.

The control unit 30 is electrically coupled to the display unit 10 and the camera unit 20. The control unit 30 receives the motion image of the user 70 and adjusts the display unit 10 according to the motion image of the user 70, so that the images displayed by the display unit 10 move as does the user 70. That is, the control unit 30 calculates the frequency and amplitude of movement of the user 70 according to the motion image of the user 70, and then adjusts both a movement frequency and a movement amplitude of the images displayed by the display unit 10 to be the same as the movement frequency and movement amplitude of the user 70. As a result, the images displayed by the display unit 10 are in a relatively non-moving state from the user's point of view. In one preferred embodiment, the camera unit 20 mainly captures images of the head portion of the user 70. Accordingly, the control unit 30 calculates a movement frequency and a movement amplitude of the head portion of the user 70 according to the motion image of the head portion of the user 70, and then adjusts and moves the display unit 10 according to both the movement frequency and the movement amplitude of the head portion of the user 70.

The prevent invention mainly uses a visual servoing technique or so-called Vision-Based Robot Control technique. The visual servoing technique or Vision-Based Robot Control technique utilizes a feedback visual signal as an input signal in a move control system. The visual servoing technique has mostly been applied to intelligent robotics. In the present invention, the camera unit 20 is a source of the visual signal. The camera unit 20 captures at least one motion image of the user 70, and then the motion image of the user 70 serves as an input signal for controlling the movement of the display unit 20.

Two methods are provided for adjusting the images displayed by the display unit 10. The first method is adjusting the movement frequency and the movement amplitude of the display unit 10, i.e. indirectly adjusting the images displayed by the display unit 10. The second method is directly adjusting at least one position of the images displayed on the display unit 10 instead of adjusting the movement of the display unit 10 in respect of frequency and amplitude of the movement of the display unit 10.

Figure 6:
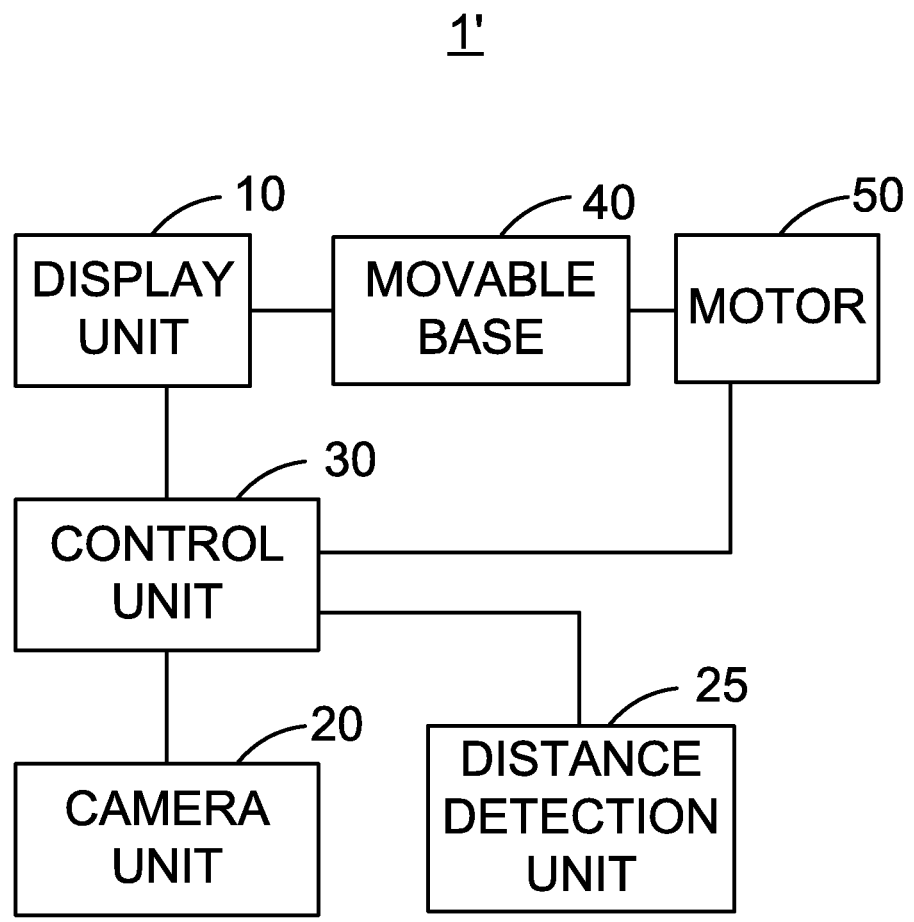
FIG. 6 illustrates a device that is capable of adjusting images according to body motion of user according to a second embodiment of the present invention.

With respect to the first method, reference is now made to FIG. 6, which illustrates a device 1' that is capable of adjusting images according to a body motion of a user 70 according to a second embodiment of the present invention. The device 1' comprises a movable base 40 and at least one motor 50. The movable base 40 carries and supports the display unit 10 thereon. The motor 50 is coupled to the control unit 30 and the movable base 40. The control unit 30 controls the motor 50 to drive the display unit 10 supported by the movable base 40, so that the movement frequency and movement amplitude of the display unit 10 are set the same as or in harmony with the movement frequency and movement amplitude of the user 70, respectively. In other words, the images displayed by the display unit 10 are kept in a relatively non-moving state with respect to the user 70.

It is noted that when there is only one camera unit 20 used in the device of the present invention, the control unit 30 is fully capable of calculating the movement frequency of the head portion of the user 70, but the distance between the user 70 and the camera unit 20 has to be assumed first before the control unit 30 calculates the movement amplitude of the head portion of the user 70. Or alternatively, the device 1' may further comprise a distance detection unit 25 electrically coupled to the control unit 30 for measuring the distance between the user 70 and the camera unit 20. The distance detection unit 25 can be disposed at the treadmill 60 as shown in FIG. 4. Accordingly, the movement amplitude of the head portion of the user 70 can be accurately calculated because of the distance detection unit 25. In one embodiment, the distance detection unit 25 can be an ultrasonic distance sensor. It is noted that the distance detection unit 25 and the camera unit 20 can be integrated into one module or independently disposed. The distance detection unit 25 and the camera unit 20 can be disposed at the treadmill 60 or disposed independently of the treadmill 60. Further, since the distance detection unit 25 is utilized for measuring the distance between the user 70 and the camera unit 20, a distance between the user 70 and the distance detection unit 25 has to be approximately the same as the distance between the user 70 and the camera unit 20 so that the movement amplitude of the head portion of the user 70 can be calculated accurately.

When two or more camera units 20 are used, the control unit 30 is capable of accurately calculating not only the movement frequency of the head portion of the user 70 but also the movement amplitude of the head portion of the user 70 according to stereo vision.

The control unit 30 may control the movable base to move with one degree of freedom, so that the display unit 10 moves up and down, or alternatively, the movable base may be moved along a path in the form of "∞" by a linkage mechanism (not shown). Since the head portion of the user 70 may possibly move asymmetrically, there exists a small error when the display unit 10 moves synchronously with respect to the user 70 with one degree of freedom. To make the display unit 10 move more synchronously and accurately, the control unit 30 may be constructed to control the movable base 40 to move with two or more degrees of freedom. Accordingly, the display unit 10 can move with two or more degrees of freedom as well. Moreover, an elevation angle of the display unit 10 can be adjusted, so that the images displayed by the display unit 10 can be in a relatively non-moving state with respect to the user 70.

The second method is to directly adjust the images displayed on the display unit 10, as shown in FIG. 5. After the control unit 30 calculates both the movement frequency and the movement amplitude of the head portion of the user 70, the control unit 30 directly adjusts at least one position of the images displayed on the display unit 10 (or a screen of the display unit), so that both the movement frequency and the movement amplitude of the images displayed on the display unit 10 are the same as or in harmony with the movement frequency and the movement amplitude of the head portion of the user 70, respectively. That is, the images displayed on the display unit 10 are kept in a relatively non-moving state with respect to the user 70. If the user 70 wants to view the images in the whole process of exercise, the images displayed on the display unit 30 must be properly reduced so that there is a sufficient amount of space to adjust the locations of images on the display unit as the images may move in random direction with arbitrary distance of movement on the display unit. As a result, when the images displayed on the display unit 30 move with the user 70, the images can be completely displayed within a displayable range of the display unit (or the screen of the display unit).

In the first embodiment, as shown in FIGS. 4 and 5, the display unit 10, the camera unit 20, and the control unit 30 are all disposed at the treadmill 60. In another embodiment, the display unit 10, the camera unit 20, and the control unit 30 are integrated as one module, and the module is disposed in front of the user 70 instead of being disposed at the treadmill 60.

In the second embodiment, as shown in FIG. 6, the display unit 10, the camera unit 20, the control unit 30, the movable base 40, the motor 50, and the distance detection unit 25 can also be disposed at the treadmill 60. In another embodiment, the display unit 10, the camera unit 20, the control unit 30, the movable base 40, the motor 50, and the distance detection unit 25 are integrated as one module, and the module is disposed in front of the user 70 instead of being disposed at the treadmill 60.

Further, the devices 1, 1', of the present invention as shown in FIGS. 5 and 6 are not limited to application to a treadmill 60. The devices 1, 1', of the present invention, as shown in FIGS. 5 and 6, can be applied to other exercising devices which can be used to exercise in a back and forth manner by a user, such as an incline trainer or an elliptical trainer.

Figure 7:
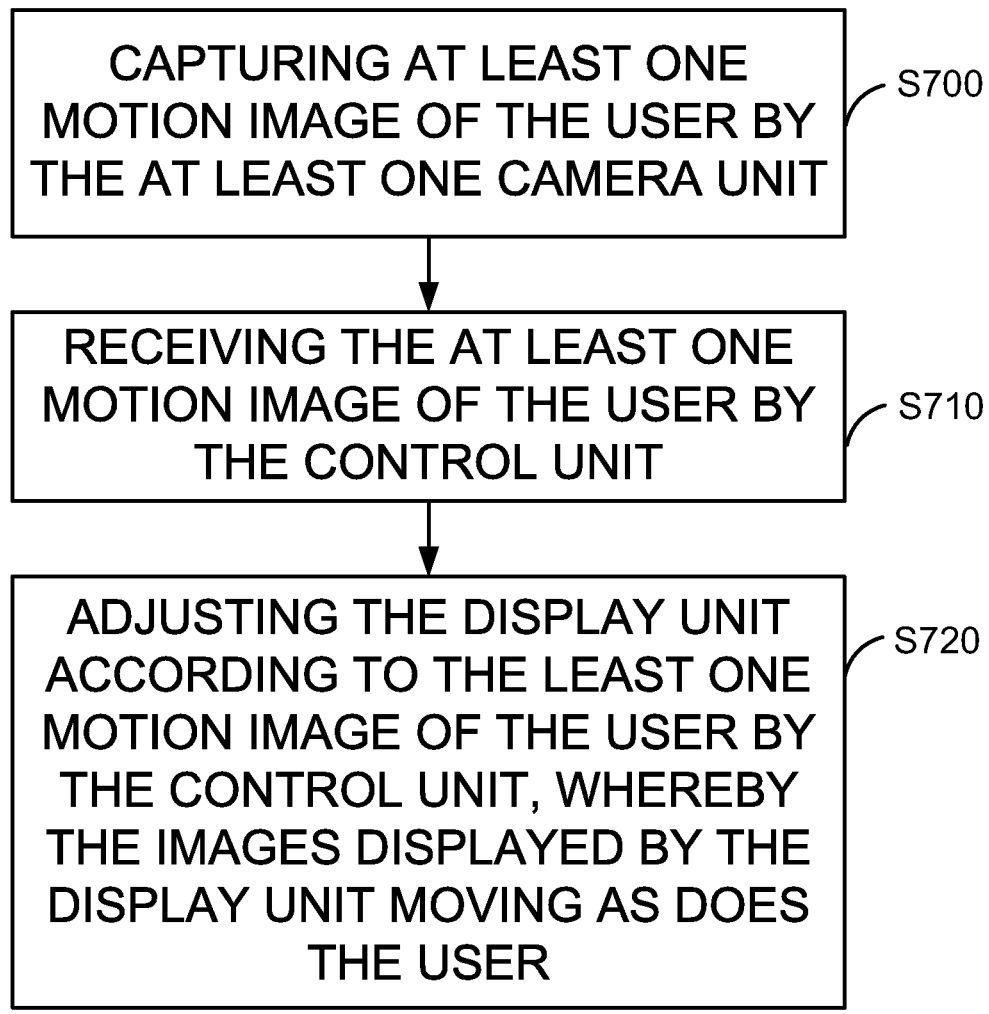
FIG. 7 illustrates a flow chart of a method to be performed in a device capable of adjusting images according to body motion of user according to the present invention.

Referring to FIG. 7, a flow chart of a method to be performed in a device capable of adjusting images according to body motion of user according to the present invention is illustrated. The device comprises a display unit, at least one camera unit, and a control unit electrically coupled to the display unit and the camera unit. The performing method comprises the following steps.

In step S700, the camera unit captures at least one motion image of the user.

In step S710, the control unit receives the motion image of the user.

In step S720, the control unit adjusts the display unit according to the motion image of the user, so that the images displayed by the display unit move as does the user. In one preferred embodiment, the camera unit mainly captures the head portion of the user.

Two methods may be adopted for adjusting the images displayed by the display unit to move as does the user. The first method is adjusting a movement frequency and a movement amplitude of the display unit, i.e. indirectly adjusting the images displayed by the display unit. The second method is directly adjusting at least one position of the images displayed on the display unit (or a screen of the display unit) instead of adjusting the frequency and amplitude with which the display unit is driven to move.

In the first method for indirectly adjusting the images displayed by the display unit, the device of the present invention may further comprise a movable base and at least one motor. The movable base carries and supports the display unit thereon. The motor is coupled to the control unit and the movable base. In the step of adjusting the display unit according to the motion image of the user (i.e. step S720), the control unit controls the motor to drive the display unit supported by the movable base, so that the movement frequency and the movement amplitude of the display unit are set the same as or in harmony with the movement frequency and the movement amplitude of the user, respectively.

It is noted that when there is only one camera unit used in the device of the present invention, the control unit is fully capable of calculating the movement frequency of the head portion of the user, but the distance between the user and the camera unit has to be assumed first before the control unit calculates the movement amplitude of the head portion of the user. Or alternatively, the device of the present invention may further comprise a distance detection unit electrically coupled to the control unit 30 for measuring the distance between the user and the camera unit. The distance detection unit can be disposed at the treadmill 60 as shown in FIG. 4. Accordingly, the movement amplitude of the head portion of the user can be calculated accurately because of the distance detection unit. In one embodiment, the distance detection unit can be an ultrasonic distance sensor.

When two or more camera units are used, the control unit 30 is capable of accurately calculating not only the movement frequency of the head portion of the user but also the movement amplitude of the head portion of the user according to stereo vision.

The control unit may control the movable base to move with one degree of freedom, so that the display unit moves up and down, or alternatively, the movable base may be moved along a path in the form of "∞" by a linkage mechanism. Since the head portion of the user may possibly move asymmetrically, there exists a small error when the display unit moves synchronously with respect to the user with one degree of freedom. To make the display unit move more asynchronously and accurately, the control unit may be constructed to control the display unit to move with two or more degrees of freedom. Accordingly, the display unit can move with two or more degrees of freedom as well. Moreover, an elevation angle of the display unit can be adjusted, so that the images displayed by the display unit can be in a relatively non-moving state with respect to the user.

The second method is to directly adjust the images displayed on the display unit. In the step of adjusting the display unit according to the motion image of the user (i.e. step S720), the control unit directly adjusts at least one position of images displayed on the display unit (or a screen of the display unit), so that a movement frequency and a movement amplitude of the images displayed on the display unit are the same as or in harmony with the movement frequency and the movement amplitude of the user, respectively. That is, the images displayed on the display unit are kept in a relatively non-moving state with respect to the user. If the user wants to view the images in the whole process of exercise, the images displayed on the display unit must be properly reduced so that there is a sufficient amount of space to adjust the locations of images on the display unit as the images may move in random direction with arbitrary distance of movement on the display unit. As a result, when the images displayed on the display unit move with the user, the images can be completely displayed within a displayable range of the display unit.

Further, the device of the present invention is applied to an exercising device which can be used to exercise in a back and forth manner by a user. The exercising device is one selected from a group consisting of a treadmill, an incline trainer, and an elliptical trainer.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A device capable of adjusting images according to a body motion of a user, the device comprising:
 a display unit for displaying images;
 at least one camera unit for capturing at least one motion image of the user; and a control unit electrically coupled to the display unit and the at least one camera unit, the control unit receiving the at least one motion image of the user, calculating a movement frequency and a movement amplitude of the user according to the at least one motion image of the user, and adjusting a movement frequency and a movement amplitude of the display unit to be the same as the movement frequency and the movement amplitude of the user, whereby the images displayed by or on the display unit moving as does the user and being in a relatively non-moving state from the user's point of view.

2. The device as claimed in claim 1, wherein the device further comprises a distance detection unit electrically coupled to the control unit to measure a distance between the user and the camera unit.

3. The device as claimed in claim 1, further comprising:
   a movable base that carries and supports the display unit thereon; and
   at least one motor coupled to the control unit and the movable base, wherein the control unit controls the at least one motor to drive the display unit supported by the movable base, so that the movement frequency and the movement amplitude of the display unit are set the same as the movement frequency and the movement amplitude of the user, respectively.

4. The device as claimed in claim 1, wherein the camera unit mainly captures an image of the head portion of the user.

5. The device as claimed in claim 1 being applied to an exercising device which is provided for a user to exercise in a back and forth fashion.

6. A device capable of adjusting images according to a body motion of a user, the device comprising:
   a display unit for displaying images;
   at least one camera unit for capturing at least one motion image of the user; and
   a control unit electrically coupled to the display unit and the at least one camera unit, the control unit receiving the at least one motion image of the user and adjusting the display unit according to the at least one motion image of the user, whereby the images displayed by or on the display unit moving as does the user,
   wherein the control unit adjusts at least one position of the images displayed on the display unit to move with at least one degree of freedom, so that a movement frequency and a movement amplitude of the images are set the same as a movement frequency and a movement amplitude of the user, respectively.

* * * * *